(12) United States Patent
Potter

(10) Patent No.: US 10,802,824 B1
(45) Date of Patent: *Oct. 13, 2020

(54) COMPUTING SYSTEM FOR MANAGING SOFTWARE DEPENDENCIES IN A PRIVATE DATA STORE

(71) Applicant: Allscripts Software, LLC, Raleigh, NC (US)

(72) Inventor: Simon Potter, Wigan (GB)

(73) Assignee: ALLSCRIPTS SOFTWARE, LLC, Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/401,306

(22) Filed: May 2, 2019

Related U.S. Application Data

(63) Continuation of application No. 15/902,750, filed on Feb. 22, 2018, now Pat. No. 10,303,465.

(51) Int. Cl.
 *G06F 8/71* (2018.01)
 *G06F 3/0484* (2013.01)
 (Continued)

(52) U.S. Cl.
 CPC ............ *G06F 8/71* (2013.01); *G06F 3/04842* (2013.01); *G06F 8/65* (2013.01); *H04L 67/34* (2013.01); *G06F 8/61* (2013.01)

(58) Field of Classification Search
 CPC .... G06F 8/10; G06F 8/60–71; G06F 3/04842; H04L 67/34
 (Continued)

(56) References Cited

U.S. PATENT DOCUMENTS 6,847,970 B2  1/2005  Keller et al.
7,222,341 B2  5/2007  Forbes et al.
(Continued)

FOREIGN PATENT DOCUMENTS

JP  2007079773 A  3/2007

OTHER PUBLICATIONS

Zhang, Hanyu, "A Comprehensive Approach for Software Dependency Resolution", A Thesis Submitted in Partial Fulfillment of the Requirements for the Degree of Master of Science in the Department of Computer Science, 2002, 110 pages.
(Continued)

*Primary Examiner* — Geoffrey R St Leger
(74) *Attorney, Agent, or Firm* — Medley, Behrens & Lewis, LLC

(57) ABSTRACT

A client computing device transmits an identifier for a target software package to a first server computing device including a public data store comprising a first plurality of software packages. The first server computing device identifies dependent software packages of the target software package in the first plurality of software packages and transmits identifiers for the dependent software packages to the client computing device. The client computing device then transmits the identifiers to a second server computing device including a private data store comprising a second plurality of software packages. The second server computing device identifies a dependent software package in the dependent software packages that is not included in the second plurality of software packages and transmits an identifier for the dependent software package to the client computing device, whereupon the client computing device causes the dependent software package to be retrieved from the public data store and stored in the private data store.

20 Claims, 7 Drawing Sheets

(51) Int. Cl.
  *H04L 29/08* (2006.01)
  *G06F 8/65* (2018.01)
  *G06F 8/61* (2018.01)
(58) Field of Classification Search
  USPC .................................. 717/120–122, 168–178
  See application file for complete search history.

(56) References Cited

U.S. PATENT DOCUMENTS

| | | | |
|---|---|---|---|
| 7,721,003 B2 * | 5/2010 | Girle | G06F 8/65 709/248 |
| 7,865,874 B2 | 1/2011 | Wookey | |
| 8,037,453 B1 | 10/2011 | Zawadzki | |
| 8,863,114 B2 * | 10/2014 | Shah | G06F 8/60 717/175 |
| 9,130,801 B1 | 9/2015 | Carruth et al. | |
| 9,389,851 B1 | 7/2016 | Nelson et al. | |
| 9,575,749 B1 | 2/2017 | Howard et al. | |
| 2004/0015953 A1 | 1/2004 | Vincent | |
| 2005/0210474 A1 | 9/2005 | Jayes, Jr. | |
| 2006/0010425 A1 | 1/2006 | Willadsen et al. | |
| 2006/0161892 A1 | 7/2006 | Anand et al. | |
| 2007/0208829 A1 | 9/2007 | Kim et al. | |
| 2008/0184212 A1 | 7/2008 | Lee et al. | |
| 2008/0189419 A1 * | 8/2008 | Girle | G06F 8/65 709/227 |
| 2009/0055809 A1 | 2/2009 | Campbell | |
| 2009/0133014 A1 | 5/2009 | Laurila et al. | |
| 2011/0185346 A1 | 7/2011 | Andrade et al. | |
| 2012/0144378 A1 * | 6/2012 | Shah | G06F 8/60 717/170 |
| 2013/0024834 A1 | 1/2013 | Cushing | |
| 2014/0215451 A1 | 7/2014 | Nachtigal | |
| 2017/0344363 A1 | 11/2017 | Chen et al. | |
| 2018/0219972 A1 | 8/2018 | Vintzel et al. | |

OTHER PUBLICATIONS

Atzenhofer, et al., "Automatically Adding Missing Libraries to Java Projects to Foster Better Results From Static Analysis", In 2017 IEEE 17th International Working Conference on Source Code Analysis and Manipulation, 2017, pp. 141-146.

"Notice of Allowance and Fees Due for U.S. Appl. No. 15/902,750", dated Jan. 9, 2019, 11 pages.

* cited by examiner

COMPUTING SYSTEM FOR MANAGING SOFTWARE DEPENDENCIES IN A PRIVATE DATA STORE

CROSS REFERENCE TO RELATED APPLICATIONS

This application is a continuation of U.S. patent application Ser. No. 15/902,750, filed on Feb. 22, 2018, and entitled "COMPUTING SYSTEM FOR MANAGING SOFTWARE DEPENDENCIES IN A PRIVATE DATA STORE", the entirety of which is incorporated herein by reference.

BACKGROUND

Computing devices are often configured to utilize software packages in order to facilitate computer-executable application development. A software package may include computer-executable instructions, an identifier for the software package, a version number for the software package, a list of software dependencies for the software package (i.e., a list of other software packages that must be installed on a computing device in order for the software package to function on the computing device), instructions for installing and using the software package, ownership information, and authorship information.

Public software repository applications have been developed to facilitate the dissemination of software packages. A public software repository application executes on a server computing device and provides other computing devices with access to software packages stored in a public data store of the server computing device. For example, the public software repository application can receive a software package (or an update to a software package) from a computing device associated with an organization or an individual tasked with developing and maintaining the software package. The public software repository application can then store the software package in the public data store. In another example, the public software repository application can receive an identifier for the software package (or an identifier for an updated version of the software package) from a second computing device, and the public software repository application can retrieve the software package from the public data store based on the identifier and transmit the software package to the second computing device. The second computing device may then incorporate the software package into a computer-executable application being developed on the second computing device and/or utilize the software package in executing another computer-executable application.

There are various drawbacks associated with public software repository applications. First, a software organization and/or software developer may wish to limit access to a software package that the organization and/or the developer has created. This is not possible when using a public software repository application as the public software repository application is configured to receive and transmit software packages to computing devices operated by the general public. Second, the public software repository application may include multiple versions of a software package, which can cause confusion among software developers. Third, data security policies of an organization may often make use of a public software repository application undesirable.

As such, private software repository applications have been developed. A private software repository application executes on a server computing device including a private data store to which access is restricted. For example, a private software repository application can be maintained by a software development organization. The private software repository application can provide access to a private data store only to computing devices associated with the organization (e.g., computing devices operated by members of the organization). Thus, a private software repository application may be unable to communicate with computing devices outside of the control of the organization, such as a server computing device executing a public software repository application.

While a private software repository application may mitigate some of the disadvantages associated with a public software repository application by restricting access to the private data store, maintaining software dependencies of the software packages in the private data store requires a computing device operated by a user to receive extensive user input. For instance, a user may determine that a software package (or an update to a software package) is required in order for a computer-executable application (or a part of a computer-executable application) stored in the private data store to function. A computing device operated by a user will receive input indicative of the software package. Responsive to receiving the input, the computing device will transmit the identifier to a public software repository application, whereupon the public software repository application will retrieve the software package using the identifier and transmit the software package to the computing device operated by the user.

The computing device will then receive input from the user causing the computing device to open the software package and present a list of dependent software packages for the software package on a display of the computing device. The computing device may then receive further input from the user causing the computing device to present a list of software packages stored in the private data store on the display. The computing device may then receive even more input from the user in order to cross-reference the list of dependent software packages against the list of software packages stored in the private data to ensure that (a) each dependent software package in the list of dependent software packages is stored in the private data store and/or (b) that version numbers of the software packages in the private data store match version numbers of the dependent software packages in the list of dependent software packages.

This process may be repeated for other software packages, such as for each software package in a computer-executable application comprising a plurality of software packages. Furthermore, a dependent software package in the list of dependent software packages may in turn have its own list of dependent software packages, thus requiring the computing device operated by the user to receive even more user input.

SUMMARY

The following is a brief summary of subject matter that is described in greater detail herein. This summary is not intended to be limiting as to the scope of the claims.

Described herein are various technologies relating to software dependency management. More specifically, a dependency application executing on a client computing device is disclosed herein. The dependency application facilitates the maintenance of software dependencies for software packages retained in a private data store.

A client computing device executing a dependency application transmits a first identifier for a target software package to a first server computing device executing a public software repository application. In an example, the target software package may be part of a computer-executable application. The client computing device is in network communication with the first server computing device. The first server computing device includes a public data store comprising a first plurality of software packages. Responsive to receiving the first identifier for the target software package, the first server computing device identifies dependent software packages of the target software package by executing a search over the public data store. The search is based on the first identifier. Responsive to identifying the dependent software packages, the first server computing device transmits identifiers for the dependent software packages to the client computing device.

The client computing device can then receive the identifiers for the dependent software packages from the first server computing device. Subsequently, the client computing device transmits the first identifier for the target software package and the identifiers for the dependent software packages to a second server computing device executing a private software repository application. The second server computing device (as well as the client computing device) may be under control of an organization (e.g., a software development organization) and the second server computing device may be unable to communicate with computing devices outside of the control of the organization (i.e., the first server computing device). The second server computing device includes a private data store comprising a second plurality of software packages. Responsive to receiving the first identifier for the target software package and the identifiers for the dependent software packages, the second server computing device identifies a dependent software package in the dependent software packages that is not included in the second plurality of software packages by executing a search over the private data store based on the first identifier for the target software package and the identifiers for the dependent software packages. The dependent software package may be a different version of a second dependent software package, wherein the second dependent software package is stored in the private data store, but the dependent software package is not. Responsive to identifying the dependent software package, the second server computing device transmits a second identifier for the dependent software package to the client computing device.

Subsequent to receiving the second identifier from the second server computing device, the client computing device can transmit the second identifier to the first server computing device. Responsive to receiving the second identifier, the first server computing device can retrieve the dependent software package from the public data store by executing a search over the public data store based on the second identifier for the dependent software package. Responsive to retrieving the dependent software package, the first server computing device can transmit the dependent software package to the client computing device.

The client computing device can then receive the dependent software package from the first server computing device. Subsequently, the client computing device can transmit the dependent software package to the second server computing device. The second server computing device can then receive the dependent software package and store the dependent software package in the private data store.

The above-described technologies provide various advantages over conventional dependency management approaches for private software repositories. For instance, the above-described technologies reduce the amount of user input required to add dependent software packages for a software package to a private data store, thus resulting in a more efficient use of client computing resources. The above-described technologies also reduce the amount of user input required to update dependent software packages for a software package in a private data store.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
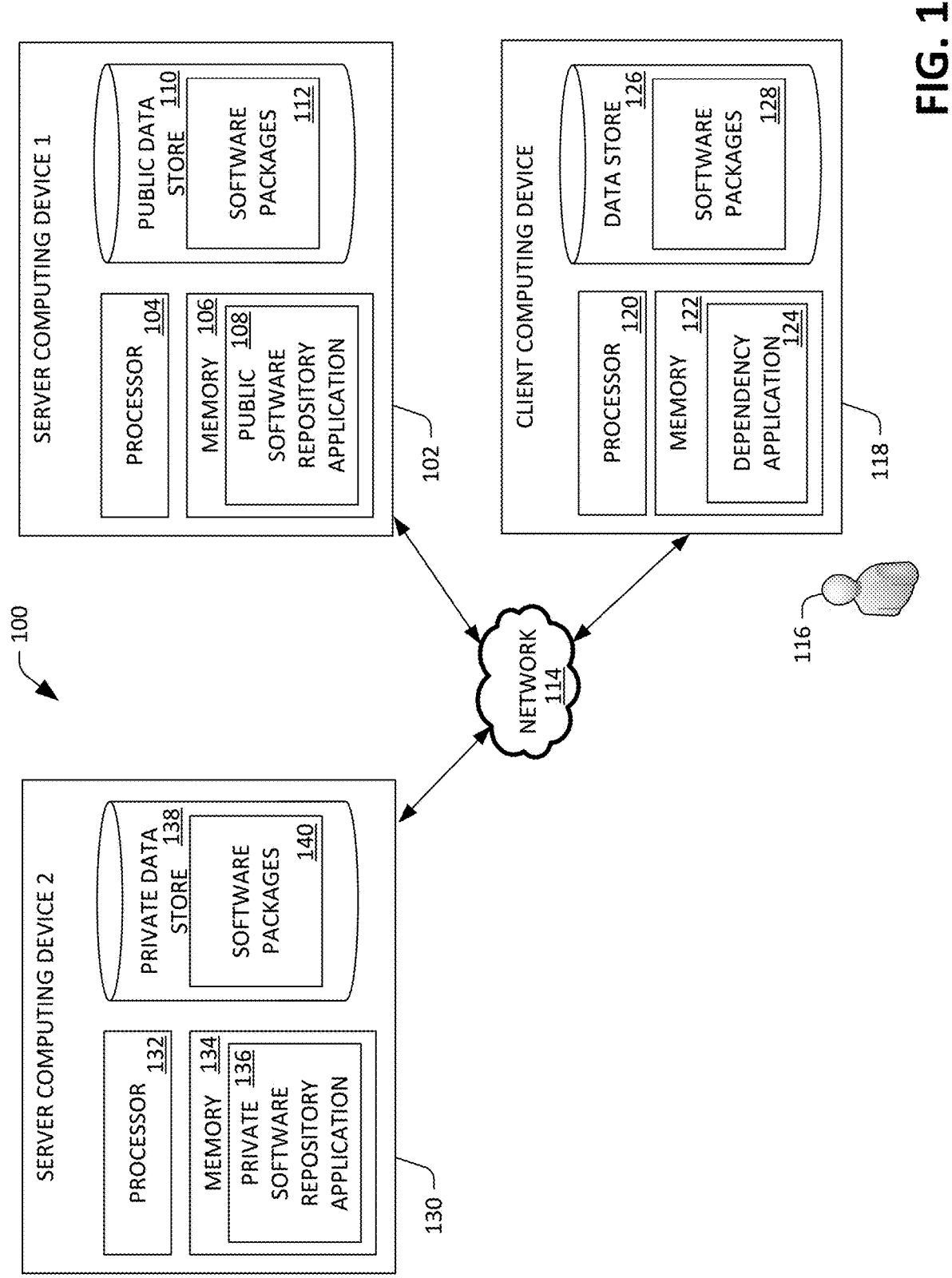
FIG. 1 is a functional block diagram of an exemplary computing system that facilitates maintaining software package dependencies.

Various technologies pertaining to dependency management for software packages are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

As used herein, the term "software package" refers to a collection of computer-executable instructions in one or more computer-readable files that, when executed by a processor of a computing device, provide the computing device with certain functionality. For example, and not by way of limitation, a software package can provide a computing device with functionality related to database access, text parsing manipulation, etc. A software package can also include an identifier for the software package, a version number for the software package, a list of software dependencies for the software package (i.e., a list of other software packages that must be installed on a computing device in order for the software package to function on the computing device), instructions for installing and using the software package, ownership information, and authorship information.

In some cases, a software package may be a stand-alone computer-executable application that can be executed by a processor of a computing device. In other cases, a software package may be incorporated into a software application so as to enable the software application to perform certain functionality provided by the software package.

As used herein the term "dependency" refers to a software package that is required by another software package in order to function. For instance, if software package A depends from software package B, software package A requires software package B to be installed on the same computing device as software package A in order for software package A to function properly when executed by a processor of the computing device. Therefore, software package B can be referred to as a dependency of software package A.

With reference to FIG. 1, an exemplary computing system 100 that facilitates maintaining software dependencies of a target software package is illustrated. The computing system 100 includes a first server computing device 102. The first server computing device 102 comprises a processor 104 and memory 106, wherein the memory 106 has a public software repository application 108 loaded therein. The first server computing device 102 further comprises a public data store 110 comprising a plurality of software packages 112. Each software package in the plurality of software packages 112 may be indexed by an identifier of a software package. It is contemplated that the plurality of software packages 112 have been created by and are maintained by many different software developers and/or software enterprises. In general, the public software repository application 108 is tasked with providing access to the plurality of software packages 112 stored in the public data store 110. For instance, the public software repository application 108 can receive a software package from a computing device and store the software package in the public data store 110. In another example, the public software repository application 108 can receive an updated version of a software package stored in the public data store 110 and can store the updated version in the public data store 110 along with the (old) version of the software package. In yet another example, the public software repository application 108 can receive a query indicative of a software package from a computing device, and the public software repository application 108 can retrieve the software package from the public data store 110 using the query and transmit the software package to the computing device.

The computing system 100 further includes a second server computing device 130. The second server computing device 130 comprises a processor 132 and memory 134, wherein the memory 134 has a private software repository application 136 loaded therein. The second server computing device 130 further comprises a private data store 138 comprising a plurality of software packages 140. It is understood that the plurality of software packages 140 in the private data store 138 may overlap in part or wholly with the plurality of software packages 112 in the public data store 110. Unlike the public data store 110, the private data store 138 may not be accessible to computing devices operated by the general public. Instead, the private data store 138 may only be accessible to computing devices under the control of an organization (e.g., a software company). The private software repository application 136 is generally tasked with maintaining the plurality of software packages 140. In an embodiment, the private software repository application 136 may employ an interface that is similar to an interface of the public software repository application 108.

In an embodiment, the plurality of software packages 140 may be comprised by a software application that is in the process of being developed by the organization and/or individual affiliated with the second server computing device 130. Furthermore, in the embodiment, the private software repository application 136 may be in communication with a build server application (not shown), wherein the build server application is tasked with building the software application using the plurality of software packages 140 stored in the private data store 138.

The computing system 100 additionally includes a client computing device 118. The client computing device 118 may be operated by a user 116 that is affiliated with the same organization as the second server computing device 130. The client computing device 118 includes a processor 120 and memory 122, wherein the memory 122 has a dependency application 124 loaded therein. In general, the dependency application 124 is tasked with maintaining software dependencies for software packages stored in the private data store 138 of the second server computing device 130. The client computing device 118 may also include a data store 126 comprising software package 128.

Operation of the computing system 100 is now set forth. In an embodiment, the dependency application 124 may present a graphical user interface (GUI) on a display of the client computing device 126. The GUI may receive input indicative of a target software package from the user 116. Responsive to receiving the input, the client computing device 118 can construct a query reflective of the input and can transmit the query to the first server computing device 102.

Responsive to receiving the query, the first server computing device 102 can identify software packages in the plurality of software packages 112 stored in the public data store 110 that match the query. The first server computing device 102 can then transmit identifiers for the software packages to the client computing device 118. The identifiers may include different versions of a software package. For example, the first server computing device 102 may identify a first version of a software package that matches the query as well as a second version of the software package that matches the query.

Responsive to receiving the identifiers for the software packages from the server computing device 102, the client computing device 118 can present the identifiers within the GUI. In the event that multiple versions of a software package exist, the client computing device 118 will present identifiers for each of the different versions of the software package within the GUI.

Subsequently, the GUI can receive a selection of a software package in the software packages (a "target software package") from the user 116. Responsive to receiving the selection, the client computing device 126 can transmit an identifier for the target software package (a "first identifier") to the first server computing device 102. The first identifier may include a name for the target software package as well as a version number for the target software package.

Responsive to receiving the first identifier, the first server computing device 102 can identify dependent software packages of the target software package in the plurality of software packages 112 by executing a search over the plurality of software packages 112. The search may be based on the first identifier for the target software package. With more specificity, the first server computing device 102 may retrieve the target software package by executing a search based on the first identifier and may extract identifiers for the dependent software packages from a list of dependent software packages found in the target software package.

The identifiers for the dependent software packages may include names of the dependent software packages and version numbers for the dependent software packages. It is to be understood that the first server computing device 102 may identify different versions of a dependent software package in the dependent software packages. For instance, the target software package may depend from a first version of a dependent software package or a second version of the dependent software package.

It is also to be understood that the target software package may have different "levels" of dependencies. For example, the target software package may depend from a first dependent package (a "primary dependency"), and the first dependent package may depend from a second dependent package (a "secondary dependency"), and so forth. Thus, it is to be understood that identifying the dependent software packages of the target software package may include identifying primary dependencies of the target software package, secondary dependencies of the target software package, etc.

Responsive to identifying the dependent software packages, the first server computing device 102 can transmit identifiers for the dependent software packages to the client computing device 118. The client computing device 118 can then receive the identifiers for the dependent software packages from the first server computing device 102. In an embodiment, the client computing device 118 can present the identifiers for the dependent software packages within a GUI presented on the display of the client computing device 118. The client computing device 118 can then transmit the identifier for the target software package and the identifiers for the dependent software packages to the second server computing device 130. In another embodiment, the client computing device 118 can transmit the identifier for the target software package and the identifiers for the dependent software packages to the second server computing device 130 responsive to receiving the identifiers for the dependent software packages from the first server computing device 102.

Responsive to receiving the identifiers for the dependent software packages, the second server computing device 130 can identify a dependent software package in the dependent software packages that is not included in the plurality of software packages 140 (referred to now as the "second plurality of software packages 140") by executing a search over the private data store 138. The search may be based on the identifiers for the dependent software packages. With more specificity, for each identifier in the identifiers, the second server computing device 130 can execute a search over the second plurality of software packages 140 in the private data store 138 based on the identifier. When a search indicates that the second server computing device 130 failed to find the software package assigned to the identifier, the second server computing device 130 can identify the software package as not being included in the private data store 138. Responsive to identifying the dependent software package in the dependent software packages, the second server computing device 130 can transmit an identifier for the dependent software package (a "second identifier") to the client computing device 118.

As described above, the identifiers for the dependent software packages may include version numbers for each dependent software package in the dependent software packages. It is understood that the second plurality of software packages 140 in the private data store 138 may include a second dependent software package that has a different version number than the version number of the dependent software package. In this case, the second server computing device 130 may identify the dependent software package as not being included in the private data store 138 as the version number of the second dependent software package does not match the version number of the dependent software package.

While the second server computing device 130 has been described as identifying a single dependent software package that is not included in the private data store 138, it is understood that the second server computing device 130 can identify more than one dependent software package in the dependent software packages that are not included in the private data store 138. Furthermore, it is understood that in the event that the second server computing device 130 fails to identify a dependent software package in the dependent software packages that is not included in the private data store 138 (i.e., all of the dependent software packages are present in the private data store 138), the second server computing device 130 can transmit a message to the client computing device 118 that all dependencies for the target software package are current in the private data store 138.

The client computing device 118 can then receive the identifier for the dependent software package from the second server computing device 130. In an embodiment, the client computing device 118 can present the identifier for the dependent software package within a GUI presented on the display of the client computing device 118. The client computing device 118 can then transmit the identifier for the dependent software package to the first server computing device 102 responsive to receiving a selection of the identifier within the GUI. In another embodiment, the client computing device 118 can transmit the identifier for the dependent software package to the first server computing device 102 responsive to receiving the identifier for the dependent software package from the second server computing device 130.

Responsive to receiving the identifier for the dependent software package, the first server computing device 102 can retrieve the dependent software package by executing a search over the plurality of software packages 112 in the public data store 110. The search may be based on the identifier for the dependent software package. Responsive to retrieieving the dependent software package, the first server computing device 102 can transmit the dependent software package to the client computing device 118.

The client computing device 118 can then receive the dependent software package from the first server computing device 102. In an embodiment, the client computing device 118 can present data in the dependent software package (e.g., version number, ownership information, etc.) within a GUI presented on the display of the client computing device 118. The user 116 can then review the metadata within the GUI and in an example, the client computing device 118 can receive input set forth by the user 116 indicating that the user 116 approves the dependent software package. The client computing device 118 can then transmit the dependent software package to the second server computing device 130. In another embodiment, the client computing device 118 can transmit the dependent software package to the second server computing device 130 responsive to receiving the dependent software package from the first server computing device 102. Responsive to receiving the dependent software package, the second server computing device 130 can store the dependent software package in the private data store 138 among the second plurality of software packages 140.

While the above-described process has been described as using a single target software package, it is understood that the process may be repeated for many target software packages. For instance, the above-described process may be repeated for target software packages in a plurality of target software packages comprised by a software application. Thus, the computing system 100 may execute the above-described process to maintain software dependencies in the private data store 138 for an entire computer-executable application stored in the private data store 138.

Moreover, the above-described process is particularly useful when the software application is an electronic health records application (EHR) or a software module that is to be incorporated into an EHR. EHRs are often configured to utilize sensitive data relating to patients in order to perform tasks related to patient care. Thus, from a security standpoint, it may be undesirable to expose details of a software package being developed for use in an EHR or EHR module. The above-described technologies can be employed by an organization developing an EHR or EHR module to reduce the amount of user input required to manage software dependencies of a software package while retaining the security benefits associated with a private software repository application.

Figure 2:
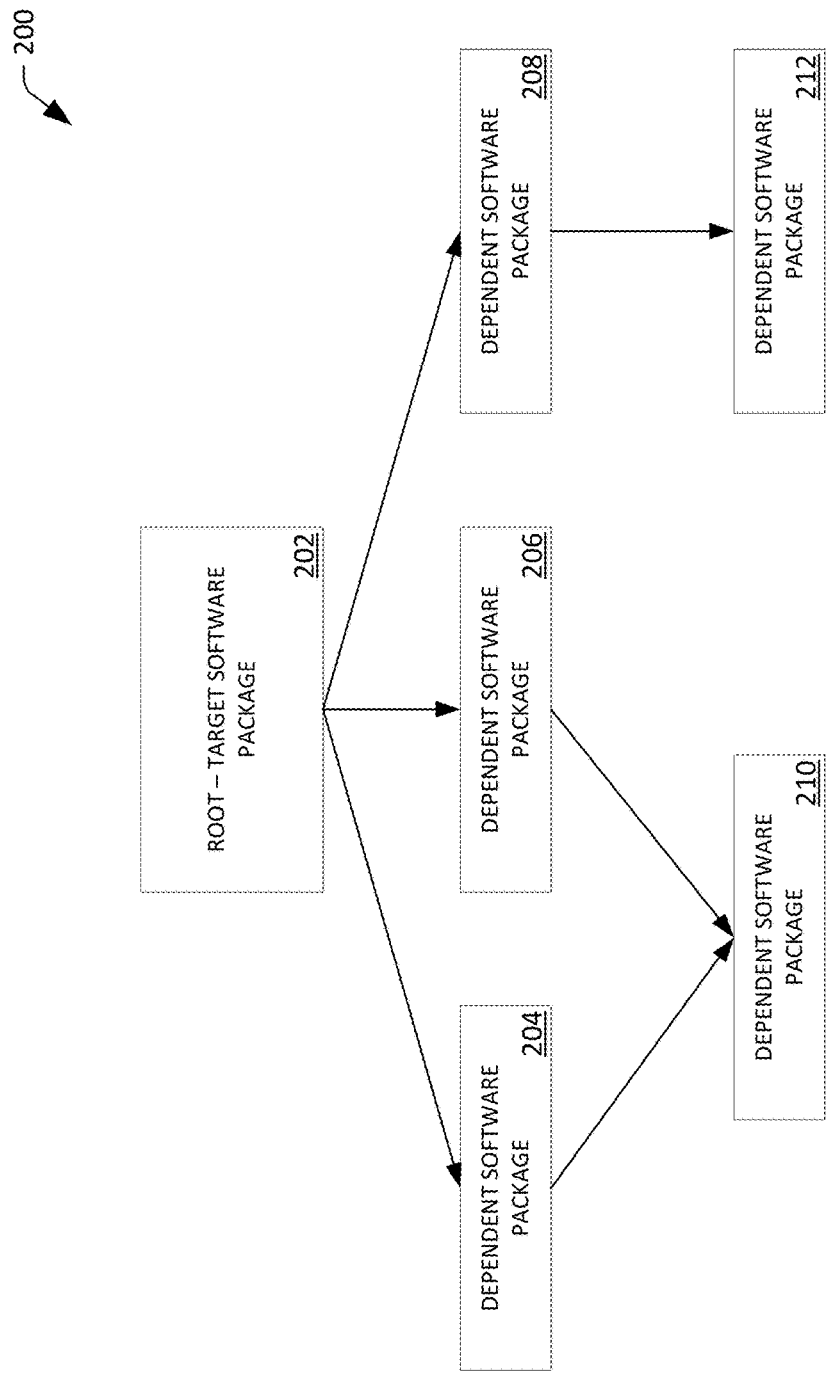
FIG. 2 is an illustration of a dependency tree for a target software package.

Referring now to FIG. 2, a dependency tree for a computer-executable application is illustrated. The dependency tree 200 comprises a root reflective of a target software package 202 and a plurality of dependent software packages 204-212. Dependencies in the dependency tree 200 are indicated by black arrows. For instance, the target software package 202 has three primary dependencies: the dependent software package 204, the dependent software package 206, and the dependent software package 208. The dependent software package 204 and the dependent software package 206 both depend from the dependent software package 210. Accordingly, the dependent software package 210 is a secondary dependency of the target software package 202. The dependent software package 208 depends from the dependent software package 212. Accordingly, the dependent software package 212 is also a secondary dependency of the target software package 202.

Figure 3:
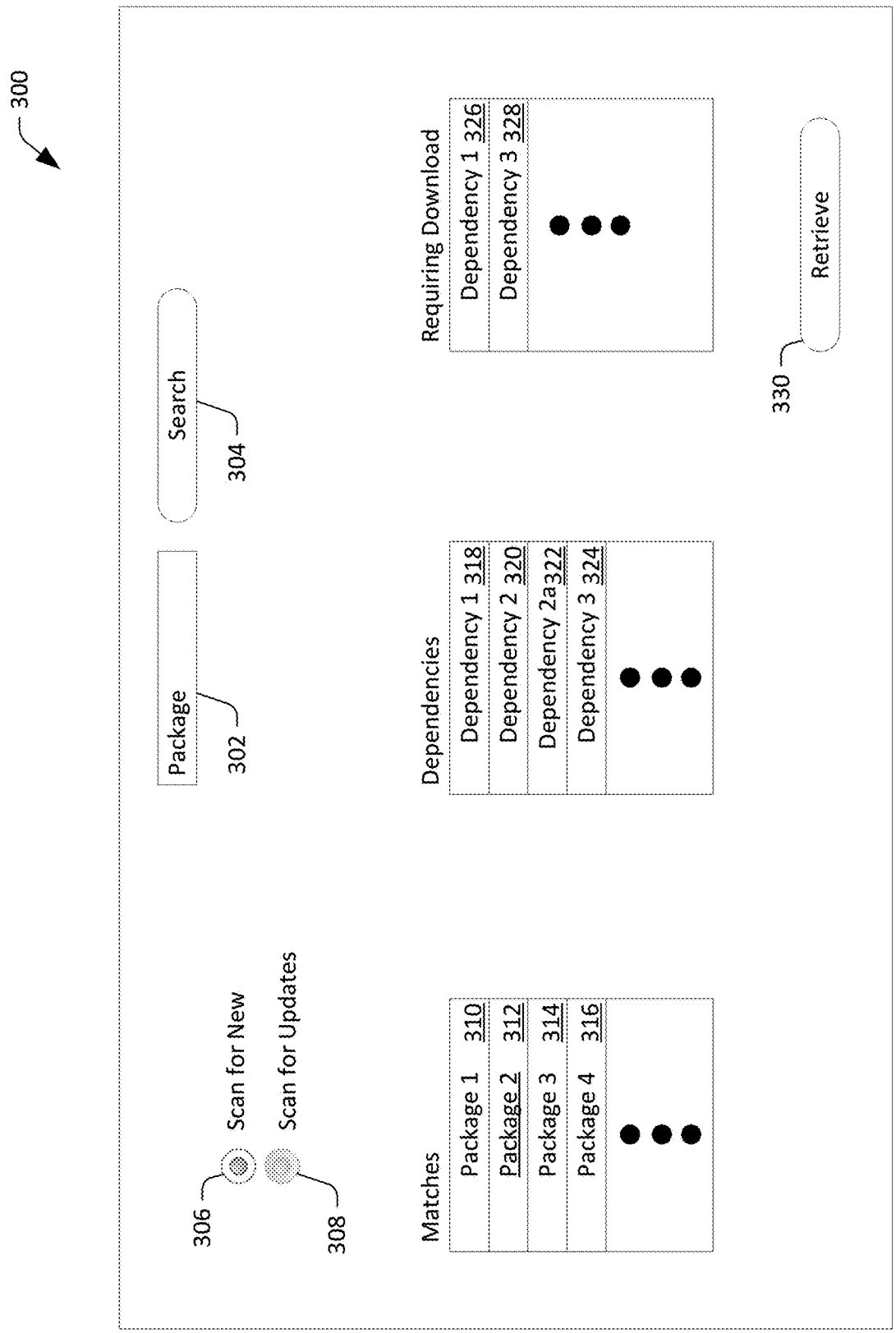
FIG. 3 is an exemplary graphical user interface (GUI) that facilitates maintaining software package dependencies.

Turning now to FIG. 3, an exemplary GUI 300 for the dependency application 122 that can be presented on a display of the client computing device 118 is depicted. The GUI 300 may include a search field 302 and a search button 304. The search field 302 can receive input from a user that is indicative of a software package. When the GUI 300 receives a selection of the search button 304 by the user, the client computing device 118 may generate a query using the contents of the search field 302 and the client computing device 118 may transmit the query to the first server computing device 102 executing the public software repository application 108 (described above).

The GUI 300 can include a first radio button 306 and a second radio button 308. When the first radio button 306 is selected within the GUI 300, the dependency application 124 may search for a new software package that is to be added to the private data store 138. When the second radio button 308 is selected within the GUI 300, the dependency application 122 may search for updates to software packages stored in the private data store 138 that are to be added to the private data store 138.

After selection of the search button 304, the GUI 300 can display selectable identifiers for software packages 310-316 that match the query. In an example, the GUI 300 can then receive a selection of the identifier for the software package 312 (a target software package) within the GUI 300 (indicated by an underline in FIG. 3). Responsive to receiving the selection of the identifier for the software package 312 within the GUI 300, the dependency application 124 can transmit an identifier for the software package 312 to the first server computing device 102 and the first server computing device 102 can identify dependent software packages of the software package 312 (described in greater detail above).

After the selection of the identifier for the software package 312, the GUI 300 can be updated to display identifiers for dependent software packages 318-324 of the software package 312. Furthermore, the GUI 300 can also be updated to display identifiers for software packages 326-328 that are not included in a private repository. When the GUI 300 receives a selection of a retrieve button 330, the dependency application 124 will transmit identifiers for the dependent software package 326 and the dependent software package 328 to the first server computing device 102, and the first server computing device 102 will retrieve the dependent software package 326 and the dependent software package 328 and transmit the packages to the client computing device 118, whereupon the client computing device 118 will transmit the packages to the second server computing device 130 (described above).

FIGS. 4-7 illustrate exemplary methodologies relating to maintaining software dependencies of a target software package in a private data store. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 4:
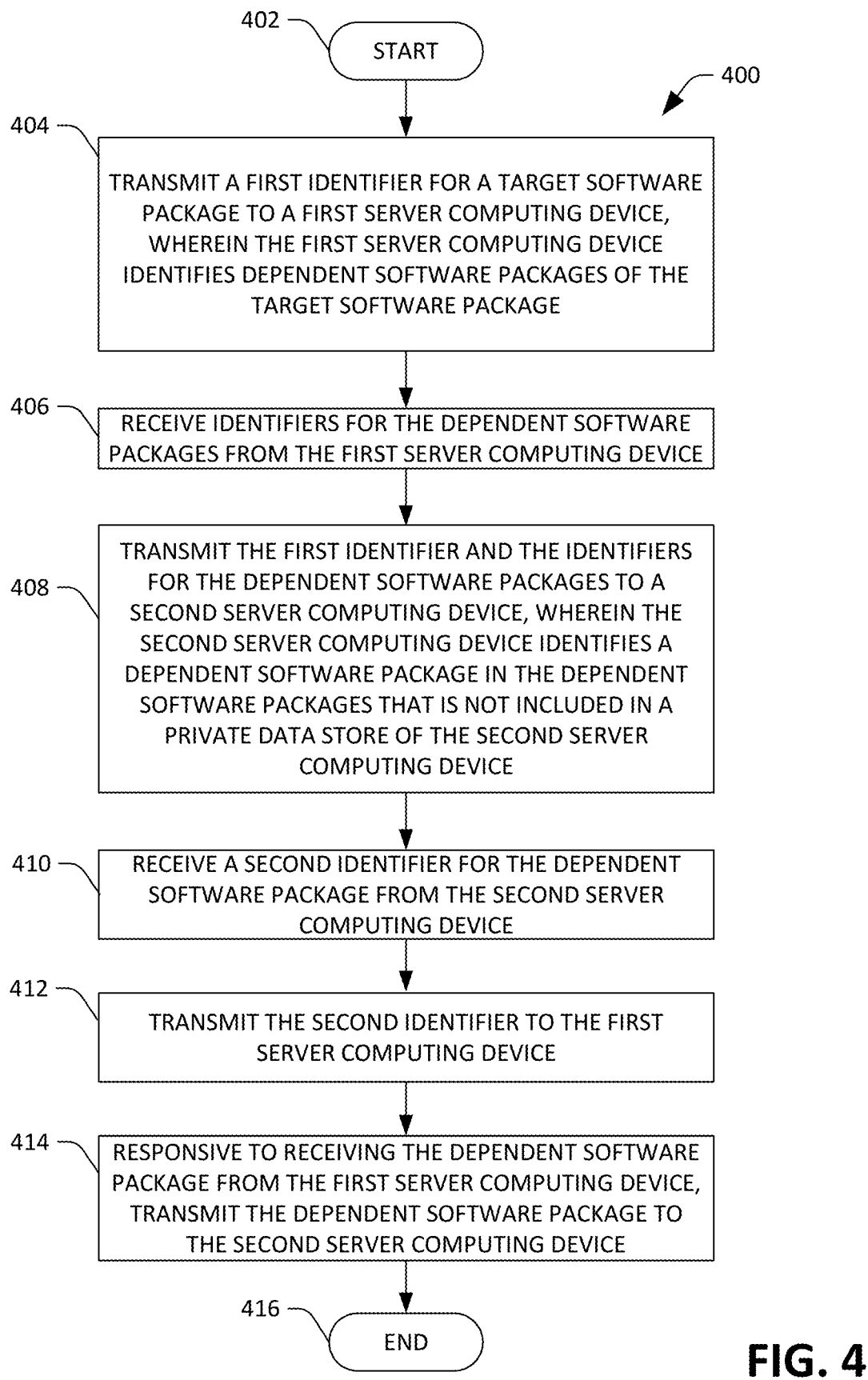
FIG. 4 is a flow diagram that illustrates an exemplary methodology performed by a client computing device that facilitates maintaining software package dependencies.

Referring now to FIG. 4, a methodology 400 performed by a client computing device executing a dependency application that facilitates maintaining software dependencies in a private data store is illustrated. The methodology 400 begins at 402, and at 404 the client computing device transmits a first identifier for a target software package to a first server computing device executing a public software repository application. The first server computing device includes a public data store comprising a first plurality of software packages. The public software repository application then identifies dependent software packages of the target software package using the first identifier. At 406, the client computing device receives identifiers for the dependent software packages from the first server computing device.

At 408, the client computing device transmits the first identifier and the identifiers for the dependent software packages to a second server computing device executing a private software repository application for an organization. The second server computing device includes a private data store comprising a second plurality of software packages. The second server computing device may be precluded from directly communicating with the first server computing device. The private software repository application then identifies a dependent software package in the dependent software packages that is not included in the second plurality of software packages and transmits a second identifier for the dependent software package to the client computing device.

At 410, the client computing device receives the second identifier from the second server computing device. At 412, the client computing device transmits the second identifier to the first server computing device, wherein the first server computing device retrieves the dependent software package using the second identifier and transmits the dependent software package to the client computing device. At 414, responsive to receiving the dependent software package from the first server computing device, the client computing device transmits the dependent software package to the second server computing device, wherein the second server computing device stores the dependent software package in the private data store. The methodology 400 concludes at 416.

Figure 5:
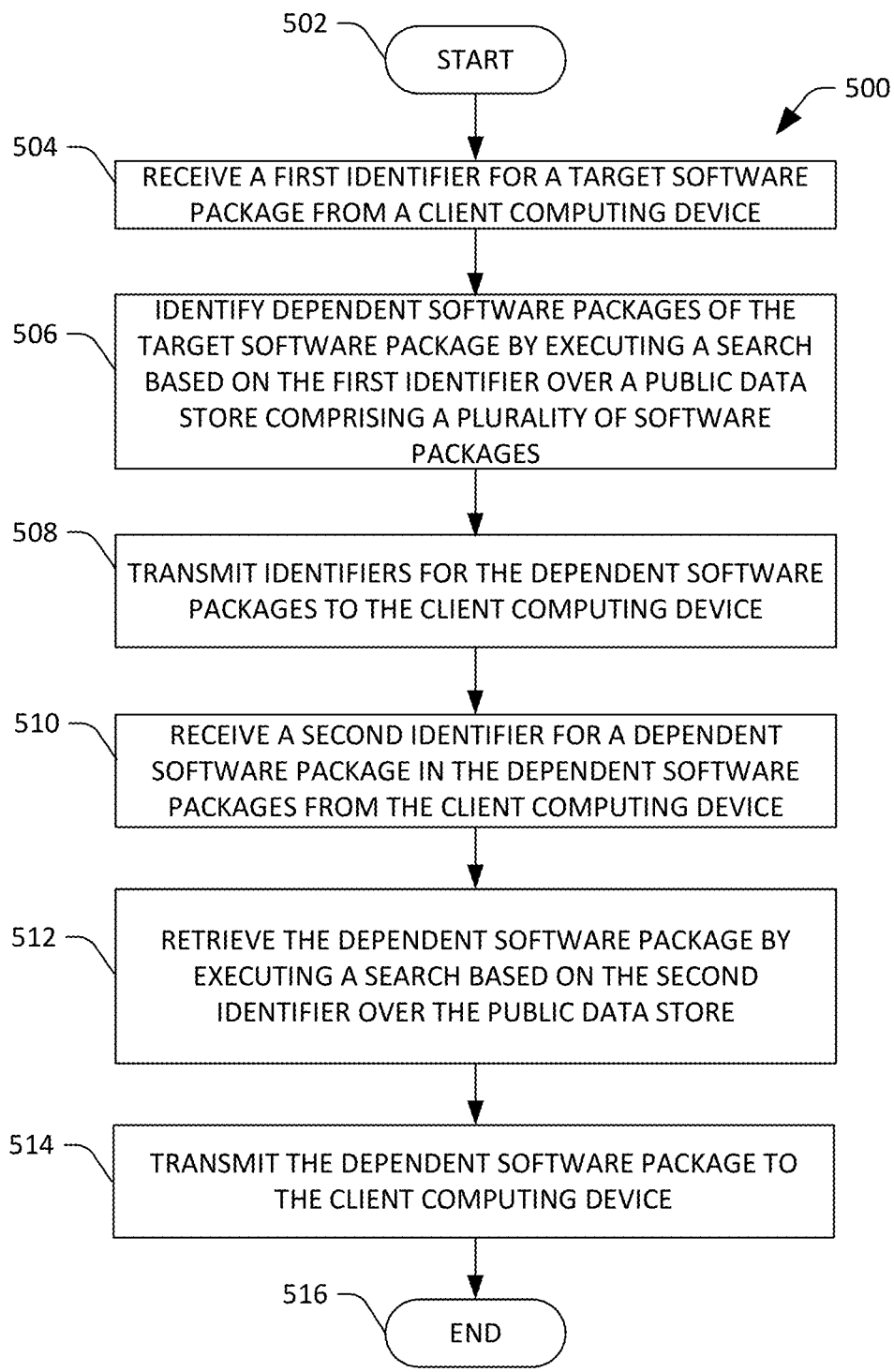
FIG. 5 is a flow diagram that illustrates an exemplary methodology performed by a first server computing device executing a public software repository application that facilitates maintaining software package dependencies.

With reference now to FIG. 5, a methodology 500 performed by a first server computing device executing a public software repository application that facilitates maintaining software dependencies is illustrated. The first server computing device includes a public data store comprising a first plurality of software packages. The methodology 500 begins at 502, and at 504 the first server computing device receives a first identifier for a target software package from a client computing device. At 506, responsive to receiving the first identifier, the public software repository application identifies dependent software packages of the target software package by executing a search over the public data store. The search is based on the first identifier. At 506, responsive to identifying the dependent software packages, the public software repository application transmits identifiers for the dependent software packages to the client computing device.

Subsequently, at 510, the first server computing device receives a second identifier for a dependent software package in the dependent software packages from the client computing device. The dependent software package is not included in a private data store of a second server computing device, the private data store comprising a second plurality of software packages. At 512, responsive to receiving the identifier for the dependent software package, the public software repository application retrieves the dependent software package from the public data store by executing a search over the public data store based on the second identifier. At 514, responsive to retrieving the dependent software package, the first server computing device transmits the dependent software package to the client computing device. The methodology 500 concludes at 516.

Figure 6:
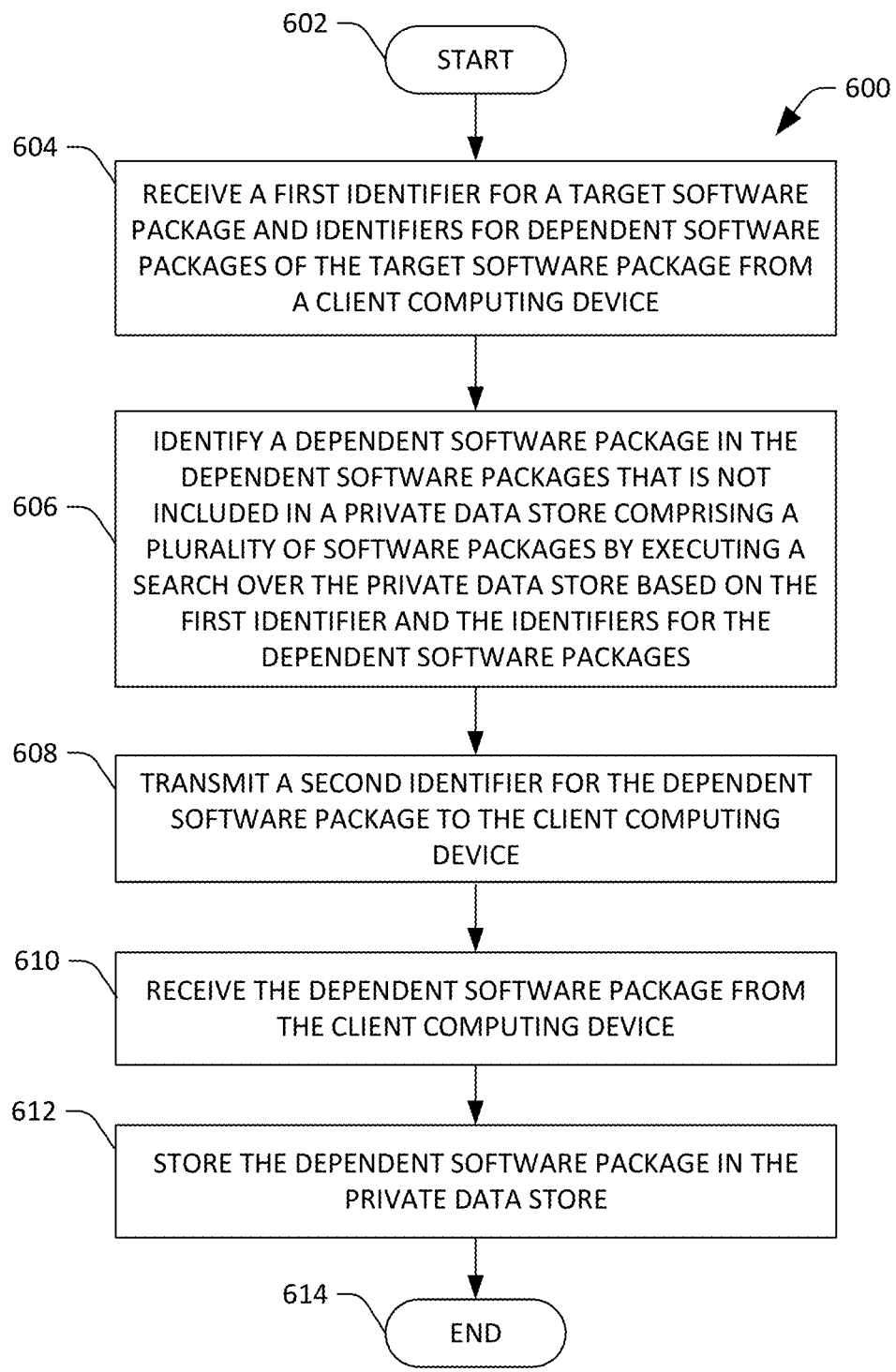
FIG. 6 is a flow diagram that illustrates an exemplary methodology performed by a second server computing executing a private software repository application that facilitates maintaining software package dependencies.

Turning now to FIG. 6, a methodology 600 performed by a second server computing device executing a private software repository application that facilitates maintaining software dependencies is illustrated. The second server computing device includes a private data store comprising a second plurality of software packages. The methodology 600 begins at 602, and at 604 the second server computing device receives a first identifier for a target software package and identifiers for dependent software packages of the target software package from a client computing device.

At 606, responsive to receiving the first identifier for the target software package and the identifiers for the dependent software packages, the second server computing device identifies a dependent software package in the dependent software packages that is not included in the private data store by executing a search over the private data store based on the first identifier and the identifiers for the dependent software packages. At 608, responsive to identifying the dependent software package, the second server computing device transmits a second identifier for the dependent software package to the client computing device. Subsequently, at 610, the second server computing device receives the dependent software package from the client computing device. At 612, responsive to receiving the dependent software package, the second server computing device stores the dependent software package in the private data store. The methodology 600 concludes at 614.

Figure 7:
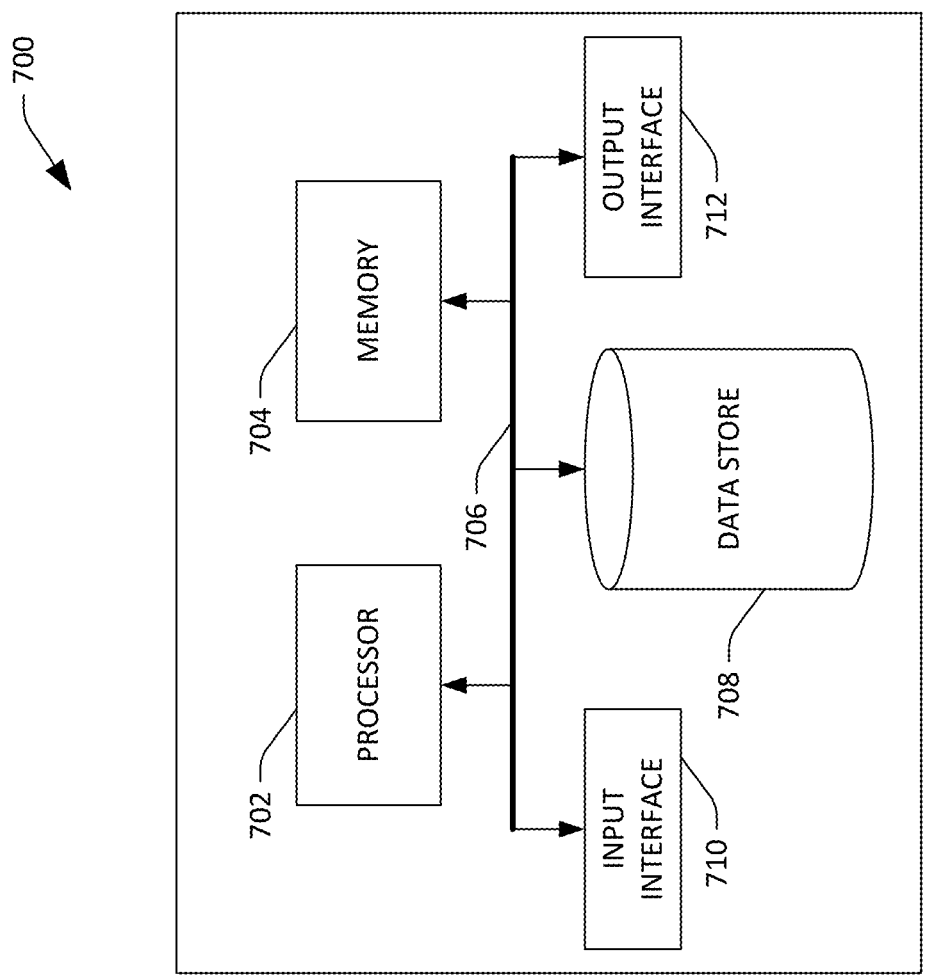
FIG. 7 is an exemplary computing system.

Referring now to FIG. 7, a high-level illustration of an exemplary computing device 700 that can be used in accordance with the systems and methodologies disclosed herein is illustrated. For instance, the computing device 700 may be used in a system that causes a dependent software package of a target software package to be stored in a private data store. By way of another example, the computing device 700 can be used in a system that causes an updated version of a dependent software package of a target software package to be stored in a private data store. The computing device 700 includes at least one processor 702 that executes instructions that are stored in a memory 704. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store software packages, identifiers for software packages, etc.

The computing device 700 additionally includes a data store 708 that is accessible by the processor 702 by way of the system bus 706. The data store 708 may include executable instructions, software packages, identifiers for software packages, etc. The computing device 700 also includes an input interface 710 that allows external devices to communicate with the computing device 700. For instance, the input interface 710 may be used to receive instructions from an external computer device, from a user, etc. The computing device 700 also includes an output interface 712 that interfaces the computing device 700 with one or more external devices. For example, the computing device 700 may display text, images, etc. by way of the output interface 712.

It is contemplated that the external devices that communicate with the computing device 700 via the input interface 710 and the output interface 712 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 700 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A server computing device comprising:
a processor;
a private data store storing a first plurality of software packages; and
memory storing a private software repository application that, when executed by the processor, causes the processor to perform acts comprising:
receiving, from a client computing device that is in network communication with the server computing device:
a first identifier, the first identifier being for a target software package; and
identifiers for dependent software packages of the target software package;
identifying a dependent software package in the dependent software packages that is not included in the first plurality of software packages based on the first identifier and the identifiers for the dependent software packages;
transmitting a second identifier to the client computing device, the second identifier being for the dependent software package, wherein a public data store comprises the dependent software package, and further wherein the client computing device retrieves the dependent software package from the public data store using the second identifier, the public data store comprised by a second server computing device, the public data store comprising a second plurality of software packages that includes the target software package and the dependent software packages; and
responsive to receiving the dependent software package from the client computing device, storing the dependent software package as part of the first plurality of software packages stored in the private data store.

2. The server computing device of claim 1, wherein the client computing device ascertains the identifiers for the dependent software packages by transmitting the first identifier to the second server computing device, wherein the second server computing device transmits the identifiers for the dependent software packages to the client computing device.

3. The server computing device of claim 1, wherein the server computing device is precluded from directly communicating with the second server computing device.

4. The server computing device of claim 1, wherein the server computing device and the client computing device are under control of an organization.

5. The server computing device of claim 1, wherein each identifier in the identifiers for the dependent software packages comprises a name of a software package and a version number of the software package.

6. The server computing device of claim 1, wherein the dependent software package is an updated version of a second dependent software package, wherein the second dependent software package is included in the first plurality of software packages stored in the private data store.

7. The server computing device of claim 1, wherein the target software package is included in a third plurality of software packages comprised by a software application, wherein the software application is an electronic health records application.

8. The server computing device of claim 1, the acts further comprising:
   causing the first plurality of software packages to be provided to a build server application, wherein the build server application builds a software application using the first plurality of software packages.

9. The server computing device of claim 1, wherein identifying the dependent software package comprises:
   executing a search over the first plurality of software packages for each identifier in the identifiers for the dependent software packages; and
   identifying the dependent software package when search results for the search indicate that the dependent software package fails to be included in the first plurality of software packages.

10. A method performed by a processor of a server computing device while the processor executes a private software repository application, the method comprising:
    receiving, from a client computing device that is in network communication with the server computing device:
        a first identifier, the first identifier being for a target software package; and
        identifiers for dependent software packages of the target software package;
    responsive to receiving the first identifier, identifying a dependent software package in the dependent software packages that is not included in a first plurality of software packages stored in a private data store comprised by the server computing device, wherein the dependent software package is identified based on the first identifier and the identifiers for the dependent software packages;
    responsive to identifying the dependent software package, transmitting a second identifier to the client computing device, the second identifier being for the dependent software package, wherein a public data store comprises the dependent software package, and further wherein the client computing device retrieves the dependent software package from the public data store using the second identifier, the public data store comprised by a second server computing device, the public data store comprising a second plurality of software packages that includes the target software package and the dependent software packages; and
    responsive to receiving the dependent software package from the client computing device, storing the dependent software package as part of the first plurality of software packages stored in the private data store.

11. The method of claim 10, wherein the server computing device is precluded from directly communicating with the second server computing device.

12. The method of claim 10, wherein the dependent software package is an updated version of a second dependent software package, wherein the second dependent software package is included in the first plurality of software packages stored in the private data store.

13. The method of claim 10, further comprising:
    causing the first plurality of software packages to be provided to a build server application, wherein the build server application builds a software application using the first plurality of software packages.

14. The method of claim 13, wherein the software application is an electronic health records application.

15. A computer-readable storage medium comprising a private software repository application that, when executed by a processor of a server computing device, causes the processor to perform acts comprising:
    receiving, from a client computing device that is in network communication with the server computing device:
        a first identifier, the first identifier being for a target software package; and
        identifiers for dependent software packages of the target software package;
    responsive to receiving the first identifier, identifying a dependent software package in the dependent software packages that is not included in a first plurality of software packages stored in a private data store comprised by the server computing device, wherein the dependent software package is identified based on the first identifier and the identifiers for the dependent software packages;
    responsive to identifying the dependent software package, transmitting a second identifier to the client computing device, the second identifier being for the dependent software package, wherein a public data store comprises the dependent software packages, and further wherein the client computing device retrieves the dependent software package from the public data store using the second identifier, the public data store comprised by a second server computing device, the public data store comprising a second plurality of software packages that include the target software package and the dependent software packages;
    responsive to receiving the dependent software package from the client computing device, storing the dependent software package as part of the first plurality of software packages stored in the private data store; and
    causing the first plurality of software packages to be provided to a build server application, wherein the build server application builds a software application using the first plurality of software packages.

16. The computer-readable storage medium of claim 15, wherein the server computing device is precluded from directly communicating with the second server computing device.

17. The computer-readable storage medium of claim 15, wherein the dependent software package is an updated version of a second dependent software package, wherein the second dependent software package is included in the first plurality of software packages stored in the private data store.

18. The computer-readable storage medium of claim 15, wherein the software application is an electronic health records application.

19. The computer-readable storage medium of claim 15, wherein the client computing device ascertains the identifiers for the dependent software packages by transmitting the first identifier to the second server computing device, wherein the second server computing device transmits the identifiers for the dependent software packages to the client computing device.

20. The computer-readable storage medium of claim 15, wherein identifying the dependent software package comprises:
   executing a search over the first plurality of software packages for each identifier in the identifiers for the dependent software packages; and
   identifying the dependent software package when search results for the search indicate that the dependent software package fails to be included in the first plurality of software packages.

* * * * *